United States Patent
Yokoyama et al.

(10) Patent No.: US 8,372,905 B2
(45) Date of Patent: *Feb. 12, 2013

(54) COATING COMPOSITIONS CONTAINING LOW MOLECULAR WEIGHT POLYTRIMETHYLENE ETHER GLYCOL

(75) Inventors: Ayumu Yokoyama, Wallingford, PA (US); Hari Babu Sunkara, Hockessin, DE (US); Rajesh Gopalan Saliya, Media, PA (US)

(73) Assignee: E I du Pont de Nemours and Company, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/047,030

(22) Filed: Mar. 14, 2011

(65) Prior Publication Data

US 2012/0053275 A1 Mar. 1, 2012

Related U.S. Application Data

(60) Provisional application No. 61/378,647, filed on Aug. 31, 2010.

(51) Int. Cl.
*C08K 5/17* (2006.01)
(52) U.S. Cl. ...................................... 524/196
(58) Field of Classification Search ............ 524/196
See application file for complete search history.

(56) References Cited

U.S. PATENT DOCUMENTS

| | | | |
|---|---|---|---|
| 4,659,780 A | 4/1987 | Stamegna et al. | |
| 5,122,522 A | 6/1992 | Laties et al. | |
| 5,633,362 A | 5/1997 | Nagarajan et al. | |
| 5,686,276 A | 11/1997 | Laffend et al. | |
| 5,821,092 A | 10/1998 | Nagarajan et al. | |
| 6,221,494 B1 | 4/2001 | Barsotti et al. | |
| 6,608,168 B1 | 8/2003 | Ng | |
| 6,720,459 B2 | 4/2004 | Sunkara et al. | |
| 6,875,514 B2 * | 4/2005 | Sormani et al. | 428/423.1 |
| 6,977,291 B2 | 12/2005 | Sunkara et al. | |
| 7,268,182 B2 * | 9/2007 | Sunkara et al. | 524/589 |
| 7,728,175 B1 | 6/2010 | Qi et al. | |
| 2004/0030095 A1 | 2/2004 | Sunkara et al. | |
| 2004/0185263 A1 * | 9/2004 | Sormani et al. | 428/422.8 |
| 2004/0225107 A1 * | 11/2004 | Sunkara et al. | 528/417 |
| 2004/0249061 A1 * | 12/2004 | Sunkara et al. | 524/589 |
| 2004/0258923 A1 * | 12/2004 | Sormani et al. | 428/422.8 |
| 2006/0222875 A1 * | 10/2006 | Sormani et al. | 428/500 |
| 2007/0190257 A1 * | 8/2007 | Huynh-Ba et al. | 427/407.1 |

FOREIGN PATENT DOCUMENTS

| | | | |
|---|---|---|---|
| WO | WO 2004/085558 | * | 10/2004 |
| WO | 2009/131097 | | 10/2009 |

OTHER PUBLICATIONS

J. Polymer Sci., Polymer Chemistry Ed. 23, 429 to 444 (1985).

* cited by examiner

*Primary Examiner* — John Uselding
(74) *Attorney, Agent, or Firm* — Gann G. Xu

(57) ABSTRACT

The present disclosure is directed to a coating composition having low molecular weight polytrimethylene ether glycol, polymers having one or more crosslinkable functional groups and a crosslinking agent having one or more crosslinking functional groups. The coating compositions can be used as interior and exterior top coats, basecoats, primers, primer surfacers and primer fillers. The disclosure is particularly directed to a coating composition comprising components derived from renewable resources.

17 Claims, No Drawings

COATING COMPOSITIONS CONTAINING LOW MOLECULAR WEIGHT POLYTRIMETHYLENE ETHER GLYCOL

FIELD OF DISCLOSURE

The present disclosure is directed to a coating composition. This disclosure is particularly directed to a coating composition comprising components derived from renewable resources.

BACKGROUND OF DISCLOSURE

A typical coating finish over a substrate comprises some or all of the following layers: (1) one or more primer layers that provide adhesion and basic protection, such as corrosion protection; (2) one or more colored layers, typically pigmented, that provide most of the protection, durability and color; and (3) one or more clearcoat layers that provide additional durability and improved appearance. A colored topcoat layer can be used in place of the colored layer and clearcoat layer. A suitable primer, primer surfacer or primer filler, collectively referred to as "primer" herein, can be applied over the substrate to form the primer layer.

There are continued needs for new coating materials.

STATEMENT OF DISCLOSURE

This disclosure is directed to a coating composition comprising:
  A) a polymer having one or more crosslinkable functional groups;
  B) a polytrimethylene ether glycol having a Mn (number average molecular weight) in a range of from 134 to 490; and
  C) a crosslinking component containing at least one crosslinking agent having one or more crosslinking functional groups.

This disclosure is also directed to a process for coating a substrate using the coating composition of this disclosure.

DETAILED DESCRIPTION

The features and advantages of the present disclosure will be more readily understood, by those of ordinary skill in the art, from reading the following detailed description. It is to be appreciated that certain features of the disclosure, which are, for clarity, described above and below in the context of separate embodiments, may also be provided in combination in a single embodiment. Conversely, various features of the disclosure that are, for brevity, described in the context of a single embodiment, may also be provided separately or in any sub-combination. In addition, references in the singular may also include the plural (for example, "a" and "an" may refer to one, or one or more) unless the context specifically states otherwise.

The use of numerical values in the various ranges specified in this application, unless expressly indicated otherwise, are stated as approximations as though the minimum and maximum values within the stated ranges were both proceeded by the word "about." In this manner, slight variations above and below the stated ranges can be used to achieve substantially the same results as values within the ranges. Also, the disclosure of these ranges is intended as a continuous range including every value between the minimum and maximum values.

As used herein:

The term "(meth)acrylate" means methacrylate or acrylate.

The term "two-pack coating composition", also known as 2K coating composition, refers to a coating composition having two packages that are stored in separate containers and sealed to increase the shelf life of the coating composition during storage. The two packages are mixed just prior to use to form a pot mix, which has a limited pot life, typically ranging from a few minutes (15 minutes to 45 minutes) to a few hours (4 hours to 8 hours). The pot mix is then applied as a layer of a desired thickness on a substrate surface, such as an automobile body. After application, the layer dries and cures at ambient or at elevated temperatures to form a coating on the substrate surface having desired coating properties, such as, high gloss, mar-resistance and resistance to environmental etching.

The term "one-pack coating composition", also known as 1K coating composition, refers to a coating composition having one package that is stored in one container and sealed to increase the shelf life of the coating composition during storage. The 1K coating composition can be formulated to be cured at certain curing conditions. Examples of such curing conditions can include: radiation, such as UV radiation including UV-A, UV-B, and UV-C radiations, electron beam (e-beam) radiation, infrared (IR) radiation, or lights in visible or invisible wavelengths; moisture, such as water accessible to the coating composition; heat energy, such as high temperatures; or other chemical or physical conditions.

The term "crosslinkable component" refers to a component having "crosslinkable functional groups" that are functional groups positioned in each molecule of the compounds, oligomer, polymer, the backbone of the polymer, pendant from the backbone of the polymer, terminally positioned on the backbone of the polymer, or a combination thereof, wherein these functional groups are capable of crosslinking with crosslinking functional groups (during the curing step) to produce a coating in the form of crosslinked structures. One of ordinary skill in the art would recognize that certain crosslinkable functional group combinations would be excluded, since, if present, these combinations would crosslink among themselves (self-crosslink), thereby destroying their ability to crosslink with the crosslinking functional groups. A workable combination of crosslinkable functional groups refers to the combinations of crosslinkable functional groups that can be used in coating applications excluding those combinations that would self-crosslink.

Typical crosslinkable functional groups can include hydroxyl, thiol, isocyanate, thioisocyanate, acid or polyacid, acetoacetoxy, carboxyl, primary amine, secondary amine, epoxy, anhydride, ketimine, aldimine, or a workable combination thereof. Some other functional groups such as orthoester, orthocarbonate, or cyclic amide that can generate hydroxyl or amine groups once the ring structure is opened can also be suitable as crosslinkable functional groups.

The term "crosslinking component" refers to a component having "crosslinking functional groups" that are functional groups positioned in each molecule of the compounds, oligomer, polymer, the backbone of the polymer, pendant from the backbone of the polymer, terminally positioned on the backbone of the polymer, or a combination thereof, wherein these functional groups are capable of crosslinking with the crosslinkable functional groups (during the curing step) to produce a coating in the form of crosslinked structures. One of ordinary skill in the art would recognize that certain crosslinking functional group combinations would be excluded, since, if present, these combinations would crosslink among themselves (self-crosslink), thereby destroying their ability to crosslink with the crosslinkable functional groups. A workable combination of crosslinking functional groups refers to the combinations of crosslinking functional groups that can be used in coating applications excluding those combinations that would self-crosslink. One of ordinary skill in the art would recognize that certain combinations of crosslinking functional group and crosslinkable functional groups would be excluded, since they would fail to crosslink and produce the film forming crosslinked structures. The crosslinking component can comprise one or more crosslinking agents that have the crosslinking functional groups.

Typical crosslinking functional groups can include hydroxyl, thiol, isocyanate, thioisocyanate, acid or polyacid, acetoacetoxy, carboxyl, primary amine, secondary amine, epoxy, anhydride, ketimine, aldimine, orthoester, orthocarbonate, cyclic amide or a workable combination thereof.

The term "vehicle", "automotive", "automobile", "automotive vehicle", or "automobile vehicle" refers to an automobile such as car, van, mini van, bus, SUV (sports utility vehicle); truck; semi truck; tractor; motorcycle; trailer; ATV (all terrain vehicle); pickup truck; heavy duty mover, such as, bulldozer, mobile crane and earth mover; airplanes; boats; ships; and other modes of transport that are coated with coating compositions.

This disclosure is directed to a coating composition. The coating composition can comprise:

A) a polymer having one or more crosslinkable functional groups;

B) a polytrimethylene ether glycol having a Mn (number average molecular weight) in a range of from 134 to 490; and C) a crosslinking component containing at least one crosslinking agent having one or more crosslinking functional groups.

The coating composition can comprise: in a range of from 10% to 80% by weight in one example, 20% to 70% by weight in another example, of the polymer; in a range of from 1% to 50% by weight in one example, 1% to 30% by weight in another example, of the polytrimethylene ether glycol and in a range of from 10% to 50% by weight in one example and 10% to 45% by weight in another example of the crosslinking agent. All weight percentages are based on the total weight of the coating composition.

The polymer can be selected from acrylic polymers, polyester polymers, polyesterurethanes, polyetherurethanes, poly(meth)acrylamides, polyepoxides, polycarbonates, or a combination thereof. The polymers can have one or more crosslinkable functional groups that can be selected from hydroxyl groups, carboxyl groups, glycidyl groups, amino groups, silane groups, or a combination thereof. The one or more functional groups can be from monomers that are used to produce the polymer, or be added to or modified on the polymer after polymerization. When more than one polymer is present in the coating composition, the crosslinkable functional groups can be on one or more of the polymers. In one example, the coating composition can comprise acrylic polymers. In another example, the coating composition can comprise polyesters. In yet another example, the coating composition can comprise acrylic polymers and polyesters. The crosslinkable functional groups can be on the acrylic polymers or on the polyesters or both.

The acrylic polymer can have a weight average molecular weight (Mw) of about 1,000 to 100,000 and can contain functional groups or pendant moieties such as, for example, hydroxyl, amino, amide, glycidyl, silane and carboxyl groups. These acrylic polymers can be straight chain polymers or copolymers, branched polymers or copolymers, block copolymers or copolymers, graft polymers or copolymers. In one example, the one or more crosslinkable functional groups can be selected from hydroxyl groups, carboxyl groups, glycidyl groups, amino groups, silane groups, or a workable combination thereof.

The acrylic polymers can be polymerized from a plurality of monomers, such as acrylates, methacrylates, or derivatives thereof, or any monomers suitable for acrylic polymers that are known to or developed by those skilled in the art. One or more of the monomers can have the functional groups or pendant moieties selected from hydroxyl groups, carboxyl groups, glycidyl groups, amino groups, silane groups, or a workable combination thereof.

Examples of suitable monomers can include linear alkyl (meth)acrylates having 1 to 12 carbon atoms in the alkyl group, cyclic or branched alkyl (meth)acrylates having 3 to 12 carbon atoms in the alkyl group, including isobornyl (meth)acrylate, styrene, alpha methyl styrene, vinyl toluene, (meth)acrylonitrile, (meth)acryl amides and monomers that have crosslinkable functional groups. Examples of monomers having crosslinkable functional groups can include, hydroxy alkyl (meth)acrylates having 1 to 4 carbon atoms in the alkyl group, glycidyl (meth)acrylate, amino alkyl (meth)acrylates having 1 to 4 carbon atoms in the alkyl group, (meth)acrylic acid, and alkoxy silyl alkyl (meth)acrylates, such as, trimethoxysilylpropyl (meth)acrylate, or derivatives or reaction products therefrom.

Further suitable unsaturated monomers that do not contain additional functional groups can include, for example, vinyl ethers, such as, isobutyl vinyl ether and vinyl esters, such as, vinyl acetate, vinyl propionate, vinyl aromatic hydrocarbons, preferably those with 8 to 9 carbon atoms per molecule. Examples of such monomers can include styrene, alpha-methylstyrene, chlorostyrenes, 2,5-dimethylstyrene, p-methoxystyrene, and vinyl toluene.

The acrylic polymers of this disclosure can generally be polymerized by free-radical copolymerization using conventional processes well known to those skilled in the art, for example, bulk, solution or bead polymerization, in particular by free-radical solution polymerization using free-radical initiators.

The acrylic polymer can contain (meth)acrylamides. Typical examples of such acrylic polymers can be polymerized from monomers including (meth)acrylamide. In one example, such acrylic polymer can be polymerized from (meth)acrylamide and alkyl (meth)acrylates, hydroxy alkyl (meth)acrylates, (meth)acrylic acid and one of the aforementioned olefinically unsaturated monomers.

In one example, the acrylic polymer can be polymerized from monomers selected from the group consisting of styrene, n-butyl acrylate, ethyl methacrylate, methyl methacrylate, butyl acrylate, 2-ethylhexyl acrylate, ethyl acrylate, isobutyl acrylate, 2-ethylhexyl methacrylate, 2-hydroxyethyl acrylate, hydroxypropyl acylate, and a combination thereof.

In another example, the acrylic polymer can be polymerized from monomers selected from the group consisting of styrene, ethylhexyl methacrylate, n-butyl acrylate, ethyl methacrylate, methyl methacrylate, hydroxyethyl methacrylate, and a combination thereof.

Acrylourethanes also can be used to form the novel coating composition of this invention. Typical useful acrylourethanes can be formed by reacting the aforementioned acrylic polymers with an organic polyisocyanate. Generally, an excess of the acrylic polymer can be used so that the resulting acrylourethane can have terminal acrylic segments having reactive groups as described above. These acrylourethanes can have reactive end groups and/or pendant groups such as hydroxyl, carboxyl, amine, glycidyl, amide, silane or mixtures of such groups. Useful organic polyisocyanates are described hereinafter as the crosslinking component but also can be used to form acrylourethanes useful in this invention. Examples of typically useful acrylourethanes can include those disclosed in Stamegna et al. U.S. Pat. No. 4,659,780.

The polyester polymers can be saturated or unsaturated and optionally, may be modified with fatty acids. The polyester polymers can be the esterification product of one or more polyhydric alcohols, such as, alkylene diols and glycols; monocarboxylic acids and a polycarboxylic acids or anhydrides thereof, such as, dicarboxylic and/or tricarboxylic acids or tricarboxylic acid anhydrides. The polyester polymers can have one or more aforementioned crosslinkable functional groups.

Examples of polyhydric alcohols used to form the polyester include triols and tetraols, such as, trimethylol propane, triethylol propane, trimethylol ethane, glycerine, and dihydric alcohols and diols that include ethylene glycol, propylene glycol, 1,3-propanediol, 1,3-butanediol, 1,4-butanediol, 1,5-pentanediol, 1,6-hexanediol, 2,2-dimethyl-1,3-propanediol, diethylene glycol, dipropylene glycol, 1,4-cyclohexane dimethanol, hydrogenated bisphenols A and F, Esterdiol 204 (Trademark of Union Carbide) and highly functional polyols, such as, trimethylolethane, trimethylolpropane, and pentaerythritol. Polyhydric alcohols having carboxyl groups may be used, such as, dimethylol propionic acid (DMPA).

Typical acids and anhydrides that can be used to form the polyester are aliphatic or aromatic carboxylic acids and anhydrides thereof, such as, adipic acid, azelaic acid, sebacic acid, dimerized fatty acids, maleic acid, maleic anhydride, succinic acid, succinic anhydride, isophthalic acid, terephthalic acid, phthalic acid, phthalic anhydride, dimethyl terephthalic acid, naphthalene dicarboxylic acid, tetrahydro- and hexahydrophthalic anhydride, tetrachlorophthalic acid, terephthalic acid bisglycol ester, benzophenone dicarboxylic acid, trimellitic acid and trimellitic anhydride.

One example of polyester polymer can be the estrification product of monomers selected from the group consisting of neopentyl glycol, trimethylol propane, 1,6 hexane diol, adipic acid, isophthalic acid and trimellitic anhydride.

Commercially available polyester polymers can be suitable. One example of the commercially available polyester polymer can include Desmophen® 1300X from Bayer, Pittsburgh, Pa., USA, under registered trademark.

The polyesterurethanes can be formed by reacting the aforementioned polyesters with an organic polyisocyanate. Generally, an excess of the polyester is used so that the resulting polyesterurethane has terminal polyester segments having reactive hydroxyl groups. Carboxy functional polyesterurethanes can also be used. Useful organic polyisocyanates are described hereinafter as the crosslinking component but can be used to form polyesterurethanes useful in this invention. Examples of typically useful coating compositions that utilize polyesterurethanes can include those disclosed in U.S. Pat. No.: 5,122,522.

The polycarbonates can be esters of carbonic acid which are obtained by the reaction of carbonic acid derivatives, e.g., diphenyl carbonate or phosgene with polyols, preferably diols. Suitable diols are any of those mentioned above.

The polyetherurethanes can be the reaction product of a polyetherpolyol and an organic polyisocyanate.

The polyepoxides can be poly epoxy hydroxy ether resins having 1,2-epoxy equivalency of about two or more, that is, polyepoxides that have on an average basis two or more epoxy groups per molecule. Preferred polyepoxides are polyglycidyl ethers of cyclic polyols. Particularly preferred are polyglycidyl ethers of ployhydric phenols, such as, bisphenol A or bisphenol F. Such polyepoxides can be produced by the etherification of polyhydric phenols with epihalohydrin or dihalohydrin, such as, epichlorohydrin or dichlorohydrin in the presence of alkali. Examples of useful polyhydric phenols are 2,bis-(4-hydroxyphenyl)ethane, 2-methyl-1,1-bis-(4-hydroxyphenyl)propane and the like. Besides polyhydric phenols, other cyclic polyols can be used to prepare the polyglycidyl ethers, such as, alicyclic phenols, particularly, cycloaliphatic polyols, and hydrogenated bisphenol A.

The polyepoxides can be chain extended with polyether or polyester polyols, such as, polycaprolactone diols and with ethoxylated bisphenol A.

The poly(meth)acrylamides can be, such as, polymers of (meth)acrylamide and alkyl (meth)acrylates, hydroxy alkyl (meth)acrylates, (meth)acrylic acid and or one of the aforementioned ethylenically unsaturated polymerizable monomers.

The polytrimethylene ether glycol can be prepared by an acid-catalyzed polycondensation of 1,3-propanediol (herein referred to as "PDO"), such as described in U.S. Pat. Nos. 6,977,291 and 6,720,459. The polytrimethylene ether glycol can also be prepared by a ring opening polymerization of a cyclic ether, oxetane, such as described in J. Polymer Sci., Polymer Chemistry Ed. 23, 429 to 444 (1985). The polycondensation of 1,3-propanediol is preferred over the use of oxetane since the diol is a less hazardous, stable, low cost, commercially available material and can be prepared by use of petro chemical feed-stocks or renewable resources.

A bio-route via fermentation of a renewable resource can be used to obtain the 1,3-propanediol (PDO). One example of renewable resources is corn since it is readily available and has a high rate of conversion to 1,3-propanediol and can be genetically modified to improve yields to the 1,3-propanediol. Examples of typical bio-route can include those described in U.S. Pat. Nos. 5, 686,276, 5,633,362 and 5,821, 092. The 1,3-propanediol obtained from the renewable source and the coating compositions therefrom can be distinguished from their petrochemical derived counterparts on the basis of radiocarbon dating such as fraction of modern carbon ($f_M$), also know as $^{14}C$ ($f_M$) and dual carbon-isotopic fingerprinting $^{13}C/^{12}C$ such as the one known as $\delta^{13}C$. The fraction of modern carbon $f_M$ is defined by National Institute of Standards and Technology (NIST) Standard Reference Materials (RFMs) 4990B and 4990C.

The polytrimethylene ether glycol can have a Mn in a range of from 134 to 650. In one example, the polytrimethylene ether glycol can have a Mn in a range of from 134 to 490. In another example, the polytrimethylene ether glycol can have a Mn in a range of from 200 to 400. In yet another example, the polytrimethylene ether glycol can have a Mn in a range of from 250 to 490. The polytrimethylene ether glycol suitable for this disclosure need to be within the aforementioned range of Mn that can be controlled by polymerization process to have polymers with desired range of Mn, fractionation of polymers to obtain polymers having desired range of Mn, or a combination thereof. The polymerization can be controlled, for example by polymerization timing, reaction temperature, reaction pressure, or a combination thereof, to produce polymers having Mn within the aforementioned Mn range. The polytrimethylene ether glycol can be fractionated or unfractionated. In one example, the fractionated polytrimethylene ether glycol can have PDO monomers, dimers, trimer, tetramers, and pentamers. In another example, the fractionated polytrimethylene ether glycol can have dimers, trimer, tetramers, and pentamers. In yet another example, the fractionated polytrimethylene ether glycol can have trimer, tetramers, pentamers and heamers. In further example, the fractionated polytrimethylene ether glycol can have tetramers, pentamers, heamers and heptamers. In one example, the unfractionated polytrimethylene ether glycol can have, such as, PDO monomers, dimers, trimers, tetramers, pentamers, heamers and heptamers.

The polytrimethylene ether glycol can include copolymers of polytrimethylene ether glycol that can also be suitable for the coating composition of this disclosure. Examples of such suitable copolymers of polytrimethylene ether glycol can be prepared by copolymerizing 1,3-propanediol with another diol, such as, ethane diol, hexane diol, 2-methyl-1,3-propanediol, 2,2-dimethyl-1,3-propanediol, trimethylol propane and pentaerythritol. In one example, the copolymers of polytrimethylene ether glycol can be polymerized from monomers have 1,3-propanediol in a range of from 50% to 99%. In another example, the copolymers of polytrimethylene ether glycol can be polymerized from monomers have 1,3-propanediol in a range of from 60% to 99%. In yet another example, the copolymers of polytrimethylene ether glycol can be polymerized from monomers have 1,3-propanediol in a range of from 70% to 99%.

One example of copolymers of poytrimethylene ether glycol can be poly(trimethylene-ethylene ether) glycol such as disclosed in U.S. 2004/0030095A1. The poly(trimethylene-co-ethylene ether) glycols can be prepared by acid catalyzed polycondensation of in a range of from 50 to 99 mole % (preferably in a range of from 60 to 98 mole %, and more preferably in a range of from 70 to 98 mole %) 1,3-propanediol and in a range of from 50 to 1 mole % (preferably in a range of from 40 to 2 mole %, and more preferably in a range of from 30 to 2 mole %) ethylene glycol.

The polytrimethylene ether glycol can have in a range of from 10% to 100% of dimers, percentage based on the total weight of the polytrimethylene ether glycol. The polytrimethylene ether glycol can have in a range of from 20% to 100% of dimers in an example, in a range of from 30% to 100% of dimers in another example, in a range of from 40% to 100% of dimers in another example, and in a range of from 50% to 100% of dimers in a yet further example, all percentage based on the total weight of the polytrimethylene ether glycol.

The polytrimethylene ether glycol useful in the compositions and methods disclosed herein can contain small amounts of other repeat units, for example, from aliphatic or aromatic diacids or diesters, such as disclosed in U.S. Pat. No. 6,608,168. This type of trimethylene ether glycol oligomer can also be called a "random polytrimethylene ether ester", and can be prepared by polycondensation of 1,3-propanediol reactant and about 10 to about 0.1 mole % of aliphatic or aromatic diacid or esters thereof, such as terephthalic acid, isophthalic acid, bibenzoic acid, naphthalic acid, bis(p-carboxyphenyl)methane, 1,5-naphthalene dicarboxylic acid, 2,6-naphthalene dicarboxylic acid, 2,7-naphthalene dicarboxylic acid, 4,4'-sulfonyl dibenzoic acid, p-(hydroxyethoxy)benzoic acid, and combinations thereof, and dimethyl terephthalate, bibenzoate, isophthlate, naphthalate and phthalate; and combinations thereof. Of these, terephthalic acid, dimethyl terephthalate and dimethyl isophthalate are preferred.

The polytrimethylene ether polymers with functional groups other than hydroxyls end groups can also be used. Examples of polytrimethylene ether glycol oligomers with amine and ester end functional groups can include those disclosed in U.S. Pat. No. 7,728,175.

A blend of polytrimethylene ether glycol having different molecular weights can be used. Blends of the polytrimethylene ether glycol and other cycloaliphatic hydroxyl containing either branched or linear oligomers can be used. Such hydroxyl containing oligomers are known to those skilled in the art. Examples of such hydroxyl containing oligomers can include those disclosed by Barsotti, et al. in U.S. Pat. No. 6,221,494.

The one or more crosslinking functional groups can comprise one or more isocyanate groups. The crosslinking agent can be selected from aliphatic polyisocyanates, cycloaliphatic polyisocyanates, aromatic polyisocyanates, trifunctional isocyanates, isocyanate adducts, or a combination thereof. The crosslinking agent can also be selected from isophorone diisocyanate, toluene diisocyanate, hexamethylene diisocyanate, diphenylmethane diisocyanate, triphenyl triisocyanate, benzene triisocyanate, toluene triisocyanate, the trimer of hexamethylene diisocyanate, or a combination thereof.

Further examples of suitable aliphatic, cycloaliphatic and aromatic polyisocyanates can include: 2,4-toluene diisocyanate, 2,6-toluene diisocyanate ("TDI"), 4,4-diphenylmethane diisocyanate ("MDI"), 4,4'-dicyclohexyl methane diisocyanate ("H12MDI"), 3,3'-dimethyl-4,4'-biphenyl diisocyanate ("TODI"), 1,4-benzene diisocyanate, trans-cyclohexane-1,4-diisocyanate, 1,5-naphthalene diisocyanate ("NDI"), 1,6-hexamethylene diisocyanate ("HDI"), 4,6-xylene diisocyanate, isophorone diisocyanate,("IPDI"), other aliphatic or cycloaliphatic di-, tri- or tetra-isocyanates, such as, 1,2-propylene diisocyanate, tetramethylene diisocyanate, 2,3-butylene diisocyanate, octamethylene diisocyanate, 2,2,4-trimethyl hexamethylene diisocyanate, dodecamethylene diisocyanate, omega-dipropyl ether diisocyanate, 1,3-cyclopentane diisocyanate, 1,2-cyclohexane diisocyanate, 1,4-cyclohexane diisocyanate, 4-methyl-1,3-diisocyanatocyclohexane, dicyclohexylmethane-4,4'-diisocyanate, 3,3'-dimethyl-dicyclohexylmethane 4,4'-diisocyanate, polyisocyanates having isocyanurate structural units, such as, the isocyanurate of hexamethylene diisocyanate and the isocyanurate of isophorone diisocyanate, the adduct of 2 molecules of a diisocyanate, such as, hexamethylene diisocyanate, uretidiones of hexamethylene diisocyanate, uretidiones of isophorone diisocyanate and a diol, such as, ethylene glycol, the adduct of 3 molecules of hexamethylene diisocyanate and 1 molecule of water, allophanates, trimers and biurets, for example, of hexamethylene diisocyanate, allophanates, trimers and biurets, for example, of isophorone diisocyanate and the isocyanurate of hexane diisocyanate. MDI, HDI, TDI and isophorone diisocyanate are preferred because of their commercial availability.

Tri-functional isocyanates also can be used, such as, triphenyl methane triisocyanate, 1,3,5-benzene triisocyanate, 2,4,6-toluene triisocyanate. Trimers of diisocyanates, such as, the trimer of hexamethylene diisocyanate, sold as Tolonate® HDT from Rhodia Corporation under the registered trademark and the trimer of isophorone diisocyanate can also be suitable.

Other suitable crosslinking components can include melamine formaldehyde, benzoguanamine formaldehyde, and urea formaldehyde.

A silane crosslinking component also can be suitable. One example of silane crosslinking component can be an aminofunctional silane crosslinking agent. Examples of suitable aminofunctional silanes can include aminomethyltriethoxysilane, gamma-aminopropyltrimethoxysilane, gamma-aminopropyltriethoxysilane, gamma-aminopropylmethyldiethoxysilane, gamma-aminopropylethyldiethoxysilane, gamma-aminopropylphenyldiethoxyysilane, N-beta(aminoethyl)gamma-aminopropyltrimethoxysilane, delta-aminobutyltriethoxysilane, delta-aminobutylethyldiethoxysilane and diethylene triamino propylaminotrimethoxysilane. Preferred are N-beta(aminoethyl)gamma-aminopropyltrimethoxysilane commercially sold as Silquest® A 1120 and diethylene triamino propylaminotrimethoxysilane that is commercially sold as Silquest® A 1130. Both of theses silanes are sold by OSi Specialties, Inc. Danbury, Conn., under respective registered trademarks.

When an amino silane crosslinking agent is used, additional amino functional curing agents, such as, primary, secondary and tertiary amines, that are well known in the art can be added. Typically, aliphatic amines containing a primary amine group, such as, diethylene triamine, and triethylene tetramine can be added. Tertiary amines, such as, tris-(dimethyl aminomethyl)-phenol can also be used.

The coating composition can further comprise one or more pigments. Any pigments suitable for coating can be used.

The coating composition can further comprise one or more solvents, ultraviolet light stabilizers, ultraviolet light absorbers, antioxidants, hindered amine light stabilizers, leveling agents, rheological agents, thickeners, antifoaming agents, wetting agents, catalysts, or a combination thereof. Any additives suitable for coating can be used.

Typical catalysts can include dibutyl tin dilaurate, dibutyl tin diacetate, dibutyl tin dichloride, dibutyl tin dibromide, triphenyl boron, tetraisopropyl titanate, triethanolamine titanate chelate, dibutyl tin dioxide, dibutyl tin dioctoate, tin octoate, aluminum titanate, aluminum chelates, zirconium chelate, hydrocarbon phosphonium halides, such as, ethyl triphenyl phosphonium iodide and other such phosphonium salts, and other catalysts or mixtures thereof known to those skilled in the art.

Typically, the coating composition can comprise up to 95% by weight, based on the weight of the coating composition, of one or more solvents. The coating composition of this disclosure can have a solid content in a range of from 20% to 80% by weight in one example, in a range of from 50% to 80% by weight in another example and in a range of from 60% to 80% by weight in yet another example, all based on the total weight of the coating composition. The coating composition of this disclosure can also be formulated at 100% solids by using a low molecular weight acrylic resin reactive diluent.

Any typical organic solvents can be used to form the coating composition of this disclosure. Examples of solvents include, but not limited to, aromatic hydrocarbons, such as, toluene, xylene; ketones, such as, acetone, methyl ethyl ketone, methyl isobutyl ketone, methyl amyl ketone and diisobutyl ketone; esters, such as, ethyl acetate, n-butyl acetate, isobutyl acetate and a combination thereof.

The coating composition should comprise no more than 20% of water and can comprise 0 to 20% of water in one example, 0 to 15% of water in another example, 0 to 10% of water in yet another example, 0 to 5% of water in a further example, and 0 to 2% of water in yet another example.

The coating composition of this disclosure can be utilized as a pigmented coating composition. The coating composition can be used as a basecoat or topcoat, such as a colored topcoat. Conventional inorganic and organic colored pigments, metallic flakes and powders, such as, aluminum flake and aluminum powders; special effects pigments, such as, coated mica flakes, coated aluminum flakes colored pigments, or a combination thereof, can be used. Transparent pigments or pigments having the same refractive index as the cured binder can also be used.

The coating composition of this disclosure can also comprise one or more ultraviolet light stabilizers in the amount of 0.01% to 10% by weight, based on the weight of the coating composition. Examples of such ultraviolet light stabilizers can include ultraviolet light absorbers, screeners, quenchers, and hindered amine light stabilizers. An antioxidant can also be added to the coating composition, in the amount of about 0.01% to 5% by weight, based on the weight of the coating composition.

Typical ultraviolet light stabilizers that are suitable for this disclosure can include benzophenones, triazoles, triazines, benzoates, hindered amines and mixtures thereof. A blend of hindered amine light stabilizers, such as Tinuvin® 328 and Tinuvin®123, all commercially available from Ciba Specialty Chemicals, Tarrytown, New York, under respective registered trademark, can be used.

Typical ultraviolet light absorbers that are suitable for this disclosure can include hydroxyphenyl benzotriazoles and derivatives; hydroxyphenyl s-triazines and derivatives; and hydroxybenzophenone U.V. absorbers and derivatives.

Typical antioxidants that are known to or developed by those skilled in the art can be suitable. Examples of commercially available antioxidants can include hydroperoxide decomposers, such as Sanko® HCA (9,10-dihydro-9-oxa-10-phosphenanthrene-10-oxide), triphenyl phosphate and other organo-phosphorous compounds, such as, Irgafos® TNPP from Ciba Specialty Chemicals, Irgafos® 168, from Ciba Specialty Chemicals, Ultranox® 626 from GE Specialty Chemicals, Mark PEP-6 from Asahi Denka, Mark HP-10 from Asahi Denka, Irgafos® P-EPQ from Ciba Specialty Chemicals, Ethanox 398 from Albemarle, Weston 618 from GE Specialty Chemicals, Irgafos® 12 from Ciba Specialty Chemicals, Irgafos® 38 from Ciba Specialty Chemicals, Ultranox® 641 from GE Specialty Chemicals and Doverphos® S-9228 from Dover Chemicals, under respective registered trademarks.

Typical hindered amine light stabilizers can include N-(1,2,2,6,6-pentamethyl-4-piperidinyl)-2-dodecyl succinimide, N(1 acetyl-2,2,6,6-tetramethyl-4-piperidinyl)-2-dodecyl succinimide, N-(2hydroxyethyl)-2,6,6,6-tetramethylpiperidine-4-ol-succinic acid copolymer, 1,3,5 triazine-2,4,6-triamine, N,N'''-[1,2-ethanediybis[[[4,6-bis[butyl(1,2,2,6,6-pentamethyl-4-piperidinyl)amino]-1,3,5-triazine-2-yl]imino]-3,1-propanediyl]]bis[N,N'''-dibutyl-N',N'''-bis(1,2,2,6,6-pentamethyl-4-piperidinyl)], poly-[[6-[1,1,3,3-tetramethylbutyl)-amino]-1,3,5-trianzine-2,4-diyl][2,2,6,6-tetramethylpiperidinyl)-imino]-1,6-hexane-diyl[(2,2,6,6-tetramethyl-4-piperidinyl)-imino]), bis(2,2,6,6-tetramethyl-4-piperidinyl)sebacate, bis(1,2,2,6,6-pentamethyl-4-piperidinyl)sebacate, bis(1-octyloxy-2,2,6,6-tetramethyl-4-piperidinyl)sebacate, bis(1,2,2,6,6-pentamethyl-4-piperidinyl)[3,5bis(1,1-dimethylethyl-4-hydroxy-phenyl) methyl]butyl propanedioate, 8-acetyl-3-dodecyl-7,7,9,9,-tetramethyl-1,3,8-triazaspiro(4,5)decane-2,4-dione, and dodecylitetradecyl-3-(2,2,4,4-tetramethyl-21-oxo-7-oxa-3, 20-diazal dispiro(5.1.11.2)henicosan-20-yl)propionate.

The coating compositions of this disclosure can comprise conventional coating additives. Examples of such additives can include wetting agents, leveling and flow control agents, for example, Resiflow®S (polybutylacrylate), BYK® 320 and 325 (high molecular weight polyacrylates), BYK® 347 (polyether-modified siloxane) under respective registered tradmarks, leveling agents based on (meth)acrylic homopolymers; rheological control agents, such as highly disperse silica, fumed silica or polymeric urea compounds; thickeners, such as partially crosslinked polycarboxylic acid or polyurethanes; antifoaming agents; catalysts for the crosslinking reaction of the OH-functional binders, for example, organic metal salts, such as, dibutyltin dilaurate, zinc naphthenate and compounds containing tertiary amino groups, such as, triethylamine, for the crosslinking reaction with polyisocyanates. The additives are used in conventional amounts familiar to those skilled in the art.

The coating compositions according to the disclosure can further contain reactive low molecular weight compounds as reactive diluents that are capable of reacting with the crosslinking agent. For example, low molecular weight polyhydroxyl compounds, such as, ethylene glycol, propylene glycol, trimethylolpropane and 1,6-dihydroxyhexane can be used.

Depending upon the type of crosslinking agent, the coating composition of this disclosure can be formulated as one-pack (1K) or two-pack (2K) coating composition. If polyisocyanates with free isocyanate groups are used as the crosslinking agent, the coating composition can be formulated as a two-pack coating composition in that the crosslinking agent is mixed with other components of the coating composition only shortly before coating application. If blocked polyisocyanates are, for example, used as the crosslinking agent, the coating compositions can be formulated as a one-pack (1K) coating composition. The coating composition can be further adjusted to spray viscosity with organic solvents before being applied as determined by those skilled in the art.

In a typical two-pack coating composition, the two packages can be mixed together shortly before application. The first package typically can contain the polymer having one or more crosslinkable functional groups, and the polytrimethylene ether glycol and, optionally, the pigments. The pigments can be dispersed in the first package using conventional dispersing techniques, for example, ball milling, sand milling, and attritor grinding. The second package can contain the crosslinking agent, such as, a polyisocyanate crosslinking agent, and solvents.

This disclosure is further directed a substrate coated with any of the aforementioned coating compositions. The substrate can be made of metal, plastic or other polymer materials, wood, ceramic, clay, concrete, stone, or other man made or natural materials. The substrate can be a vehicle, such as the aforementioned vehicles or automobiles; home appliance, such as refrigerators, washing machines, dishwashers, microwave ovens, cooking and baking ovens; electronic appliances, such as television sets, computers, electronic game sets, audio and video equipments; recreational equipments, such as bicycles, ski equipments, all terrain vehicles; and home or office furniture, such as tables, file cabinets. The substrate can also have one or more existing coating layers.

This disclosure is further directed a process for coating a substrate and a substrate coated with the process. The process can comprise the steps of:

(A) applying the aforementioned coating composition over the substrate to form a wet coating layer; and (B) curing the wet coating layer to form a coating on said substrate.

The coating composition according to the disclosure can be suitable for vehicle and industrial coating and can be applied using known processes. In the context of vehicle coating, the coating composition can be used both for vehicle original equipment manufacturing (OEM) coating and for repairing or refinishing coatings of vehicles and vehicle parts.

The coating composition can be applied by conventional techniques, such as, spraying, electrostatic spraying, dipping, brushing, and flow coating. Typically, the coating is applied to a dry film thickness of 0.01 mm to 1 mm and preferably, 0.05 mm to 0.5 mm, and more preferably, 0.05 mm to 0.15 mm.

The aforementioned substrates can be suitable. A substrate having one or more existing coating layers can also be suitable.

The wet coating layer can be cured at ambient temperatures, such as in a range of from 18° C. to 35° C., or at elevated temperatures, such as at temperatures in a range of from 35° C. to 150° C. Typical curing temperatures of 20° C. to 80° C., in particular of 20° C. to 60° C., can be used for vehicle repair or refinish coatings.

EXAMPLES

Procedure 1: Preparation of Polytrimethylene Ether Glycol Having Number Average Molecular Weight 250

Twelve kilogram (kg) renewably sourced 1,3-propanediol (PDO) monomers commercially available from DuPont Tate & Lyle Bioproducts, Wilmington, Del., USA, were added to a 20 L glass reactor equipped with a condenser and an agitator. The glass reactor was purged with $N_2$ at the rate 3 L/min. Triflic acid (trifluoromethanesulfonic acid) was added into the reactor to a final concentration of 0.1 wt % and the mixture was heated up to 180° C. with agitation set to 200 RPM to allow the acid-catalyzed polycondensation to proceed. The reaction volatiles were condensed in the condenser and the crude polymer product was retained in the reactor. Crude polymer samples were taken periodically for color and molecular weight analysis. Once the desired Mn was achieved, the polymerization was terminated by turning the heat down. The polymer was neutralized by treating the crude polymer with XUS ion exchange resin, available from Dow Chemical, Midland, Michigan, USA, in 2 stages. In the first stage, 2 weight parts of the XUS ion exchange resin and 98 weight parts of the crude polymer were mixed at a temperature of about 105° C. for about 1 hour. In the second stage, an additional 2 weight parts of the XUS ion exchange resin was added to the crude polymer and further mixed for additional 3 hours. Neutralization was conducted under sub-surface nitrogen sparging of 5 L/min and a mixing speed of 200 RPM. The product was filtered to remove the ion exchange resin. Filtration was done at 60° C. Once the product was free of solids, it was dried by heating to about 95° C., with sub-surface nitrogen sparging of about 10 L/min and mixing speed of 150 RPM. An antioxidant, BHT (Butylated hydroxyl toluene), available from Aldrich, St. Louis, Mo., USA, was added to the crude polymer to a final concentration about 200 ppm.

Procedure 2: Fractionation of Polytrimethylene Ether Glycol

To a 500 mL, 3-neck round bottom flask equipped with a mechanical stirrer, a distillation adapter, a condenser and a graduated distillation receiver, 367.6 g of polytrimethylene ether glycol having number average molecular weight of 250 was added. The polymer was heated with a proportional integral derivative (PID) controller connected to a heating mantle and thermocouple. The controller was set to maintain a batch temperature of 50° C. at a power setting of 50% (300 mL-2L). The flask was fully vacuumed to less than 5 torr, then the controller was turned on, and the reaction was stirred at 200 rpm. The temperature set point and the stirring speed were increased to a maximum of 280° C. and 300 rpm, respectively as the distillation progressed. Several fractions were collected, approximately every 20 mL, using the distilling receiver to remove the flask containing the fraction while maintaining the vacuum on the distillation flask. The temperature controller and vacuum pump were turned off after 8 hours and the remaining material was allowed to cool overnight under a blanket of nitrogen.

TABLE 1

Fractionation of polytrimethylene ether glycol.

| | PDO | Dimer | Trimer | Tetramer | Pentamer | Hexamer | Heptamer |
|---|---|---|---|---|---|---|---|
| Unfractionated | 2.7% | 15.0% | 20.0% | 22.4% | 18.6% | 15.9% | 3.8% |
| B-1 | 32.9% | 46.5% | 12.7% | 0.9% | — | — | — |
| B-2 | 16.6% | 52.0% | 21.8% | 5.0% | — | — | — |
| B-3 | 4.9% | 52.4% | 31.4% | 8.7% | 0.6% | — | — |
| B-4 | 1.7% | 43.4% | 36.4% | 15.6% | 1.1% | — | — |
| B-5 | 0.5% | 37.4% | 40.4% | 18.4% | 1.8% | — | — |
| B-6 | — | 27.9% | 44.1% | 23.4% | 3.2% | — | — |
| B-7 | — | 17.2% | 44.0% | 30.9% | 6.7% | — | — |
| B-8 | — | 9.7% | 42.8% | 36.5% | 9.7% | — | — |
| B-9 | — | 2.0% | 41.8% | 42.0% | 12.8% | — | — |
| B-10 | — | — | 30.5% | 46.0% | 19.8% | 2.3% | — |
| B-11 | — | — | 18.9% | 48.1% | 26.9% | 5.3% | — |
| B-12 | — | — | 10.6% | 49.5% | 32.3% | 7.0% | — |
| B-13 | — | — | 3.9% | 47.7% | 38.5% | 9.4% | — |
| B-14 | — | — | 0.6% | 41.6% | 45.0% | 12.2% | — |
| B-15 | — | — | — | 28.7% | 49.7% | 20.4% | 0.7% |
| B-16 | — | — | — | 17.0% | 51.4% | 27.6% | 2.0% |

The fractions were analyzed by GC-MS and concentrations of oligomers present in unfractionated and fractionated polytrimethylene ether glycol are reported in Table 1.

Calculated number average molecular weights (Mn) for the polytrimethylene ether glycol are shown in Table 2.

TABLE 2

Number average molecular weight (Mn).

| Polytrimethylene ether glycol | Calculated Mn |
|---|---|
| Dimer | 134 |
| Trimer | 192 |
| Tetramer | 250 |
| Pentamer | 308 |
| Hexamer | 366 |
| Heptamer | 424 |

Coating Compositions

Coating compositions are prepared according to Table 3.

TABLE 3

Coating Compositions (in gram).

| | Ex 1 | Ex 2 | Ex 3 | Ex 4 | Ex 5 | Ex 6 |
|---|---|---|---|---|---|---|
| Low Tg Acrylic polymer [1] | — | 47.9 | — | 70.4 | — | — |
| High Tg Acrylic polymer [2] | 51.4 | — | 72.3 | — | 27.2 | 40.2 |
| Polyester [3] | — | — | — | — | 25.3 | 32.9 |
| Pigments Dispersion [4] | 22.9 | 22.5 | — | — | 23.1 | — |
| Unfractionated Polytrimethylene ether glycol [5] | 14.2 | 14.1 | 14.2 | 14.2 | 14.2 | 14.2 |
| Fractionated Polytrimethylene ether glycol [6] | — | — | — | — | — | — |
| Isocyanates crosslinking agent (FG-1333) [7] | 11.5 | 15.5 | 13.5 | 15.4 | 10.2 | 12.7 |
| Total | 100 | 100 | 100 | 100 | 100 | 100 |

TABLE 3-continued

Coating Compositions (in gram).

| | Ex 7 | Ex 8 | Ex 9 | Ex 10 | Ex 11 | Ex 12 |
|---|---|---|---|---|---|---|
| Low Tg Acrylic polymer [1] | — | 47.9 | — | 70.4 | — | — |
| High Tg Acrylic polymer [2] | 51.4 | — | 72.3 | — | 27.2 | 40.2 |
| Polyester [3] | — | — | — | — | 25.3 | 32.9 |
| Pigments Dispersion [4] | 22.9 | 22.5 | — | — | 23.1 | — |
| Unfractionated Polytrimethylene ether glycol [5] | — | — | — | — | — | — |
| Fractionated Polytrimethylene ether glycol [6] | 8.6 | 8.6 | 8.6 | 8.6 | 8.6 | 8.6 |
| Isocyanates crosslinking agent (FG-1333) [7] | 11.5 | 15.5 | 13.5 | 15.4 | 10.2 | 12.7 |
| Total | 94.4 | 94.4 | 94.4 | 94.4 | 94.4 | 94.4 |

| | Ex 13 | Ex 14 | Ex 15 | Ex 16 |
|---|---|---|---|---|
| Low Tg Acrylic polymer [1] | 27.2 | 40.2 | 27.2 | 40.2 |
| High Tg Acrylic polymer [2] | — | — | — | — |
| Polyester [3] | 25.3 | 32.9 | 25.3 | 32.9 |
| Pigments Dispersion [4] | 23.1 | — | 23.1 | — |
| Unfractionated Polytrimethylene ether glycol [5] | — | — | 14.2 | 14.2 |
| Fractionated Polytrimethylene ether glycol [6] | 8.6 | 8.6 | — | — |

TABLE 3-continued

| Coating Compositions (in gram). | | | | |
|---|---|---|---|---|
| Isocyanates crosslinking agent (FG-1333)[7] | 10.2 | 12.7 | 10.2 | 12.7 |
| Total | 94.4 | 94.4 | 94.4 | 94.4 |

[1] The low Tg Acrylic polymers from Procedure 1 in PCT Patent Publication No.: 2009/131907.
[2] The high Tg acrylic polymer is Joncryl ® 918 with a Tg of about +36° C., available from BASF Resins, Sturtevant, WI, USA.
[3] The polyester is available as Desmophen ® 1300X from Bayer, Pittsburgh, PA, USA, under registered trademark.
[4] Pigments dispersion is prepared as described in Procedure 2 in PCT Patent Publication No.: 2009/131907.
[5] The polytrimethylene ether glycol is prepared in Procedure 1 without fractionation.
[6] The fractionated polytrimethylene ether glycol is the B-3 fraction from Procedure 2.
[7] FG-1333 is a crosslinking activator comprising diisocyanates, available from E. I. DuPont de Nemours and Company, Wilmington, DE, USA.

What is claimed is:

1. A coating composition comprising:
   A) a polymer having one or more crosslinkable functional groups;
   B) a polytrimethylene ether glycol having a Mn (number average molecular weight) in a range of from 134 to 490, wherein said Mn is based on all polytrimethylene ether glycol in said coating composition; and
   C) a crosslinking component containing at least one crosslinking agent having one or more crosslinking functional groups;
   wherein said polytrimethylene ether glycol is fractionated and free from hexamers and heptamers of 1,3-propanediol.

2. The coating composition of claim 1, wherein the polytrimethylene ether glycol has a Mn in a range of from 200 to 490.

3. The coating composition of claim 1, wherein the polytrimethylene ether glycol has in a range of from 10% to 100% of dimers, percentage based on the total weight of the polytrimethylene ether glycol.

4. The coating composition of claim 1, wherein the polytrimethylene ether glycol is polymerized from bio-derived 1,3-propanediol.

5. The coating composition of claim 1, wherein said one or more crosslinkable functional groups are selected from hydroxyl groups, carboxyl groups, glycidyl groups, amino groups, silane groups, or a combination thereof.

6. The coating composition of claim 1, wherein said one or more crosslinking functional groups comprise isocyanate group.

7. The coating composition of claim 1, wherein the polymer has a weight average molecular weight of 1,000 to 100,000.

8. The coating composition of claim 1, wherein the polymer is selected from acrylic polymers, polyester polymers, polyesterurethanes, polyetherurethanes, poly(meth)acrylamides, polyepoxides, polycarbonates, or a combination thereof.

9. The coating composition of claim 8, wherein the acrylic polymer is polymerized from monomers selected from the group consiting of styrene, n-butyl acrylate, ethyl methacrylate, methyl methacrylate, butyl acrylate, 2-ethylhexyl acrylate, ethyl acrylate, isobutyl acrylate, 2-ethylhexyl methacrylate, 2-hydroxyethyl acrylate, hydroxypropyl acylate, and a combination thereof.

10. The coating composition of claim 8, wherein the acrylic polymer is polymerized from monomers selected from the group consisting of styrene, ethylhexyl methacrylate, n-butyl acrylate, ethyl methacrylate, methyl methacrylate, hydroxyethyl methacrylate, and a combination thereof.

11. The coating composition of claim 1, wherein the crosslinking agent is selected from aliphatic polyisocyanates, cycloaliphatic polyisocyanates, aromatic polyisocyanates, trifunctional isocyanates, isocyanate adducts or a combination thereof.

12. The coating composition of claim 1, wherein said crosslinking agent is selected from isophorone diisocyanate, toluene diisocyanate, hexamethylene diisocyanate, diphenylmethane diisocyanate, triphenyl triisocyanate, benzene triisocyanate, toluene triisocyanate, the trimer of hexamethylene diisocyanate, or a combination thereof.

13. The coating composition of claim 1 further comprising one or more pigments.

14. The coating composition of claim 1 further comprising one or more solvents, ultraviolet light stabilizers, ultraviolet light absorbers, antioxidants, hindered amine light stabilizers, leveling agents, rheological agents, thickeners, antifoaming agents, wetting agents, catalysts, or a combination thereof.

15. A substrate coated with the coating composition of claim 1, 2, 3, 4, 5, 6, 7, 8, 9, 10, 11, 12, 13, or 14.

16. A process for coating a substrate, said process comprising the steps of:
   (A) applying the coating composition of claim 1 over said substrate to form a wet coating layer; and
   (B) curing said wet coating layer to form a coating on said substrate.

17. The substrate of claim 15, wherein said substrate is coated by applying said coating composition over said substrate to form a wet coating layer and curing said wet coating layer to form a coating on said substrate.

* * * * *